US006638193B2

United States Patent
Hamai

(12) United States Patent
(10) Patent No.: US 6,638,193 B2
(45) Date of Patent: *Oct. 28, 2003

(54) TRANSMISSION SYSTEM FOR AUTOMOTIVE VEHICLE

(75) Inventor: Kyugo Hamai, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/986,036

(22) Filed: Nov. 7, 2001

(65) Prior Publication Data
US 2002/0086755 A1 Jul. 4, 2002

(30) Foreign Application Priority Data

Dec. 28, 2000 (JP) ........................................ 2000-400854

(51) Int. Cl.[7] ................................................ F16H 3/72
(52) U.S. Cl. ................................ 475/5; 475/151; 479/5
(58) Field of Search ........................... 475/5, 151, 296, 475/207, 218, 317, 1; 477/5

(56) References Cited

U.S. PATENT DOCUMENTS

| 2,861,225 | A | | 11/1958 | Mergen | |
|---|---|---|---|---|---|
| 5,730,675 | A | * | 3/1998 | Yamaguchi | 475/2 |
| 5,846,155 | A | * | 12/1998 | Taniguchi et al. | 477/2 |
| 6,184,603 | B1 | | 2/2001 | Hamai et al. | 310/75 R |
| 6,210,297 | B1 | | 4/2001 | Knight | 475/35 |
| 6,409,623 | B1 | * | 6/2002 | Hoshiya et al. | 475/5 |
| 6,447,417 | B2 | * | 9/2002 | Kanehisa | 475/5 |
| 2001/0019980 | A1 | * | 9/2001 | Kanehisa | 475/5 |
| 2001/0029220 | A1 | * | 10/2001 | Kato | 477/5 |
| 2002/0094899 | A1 | * | 7/2002 | Hamai | 475/5 |

FOREIGN PATENT DOCUMENTS

| DE | 618 611 | 10/1935 |
|---|---|---|
| EP | 0 793 033 A1 | 9/1997 |
| JP | 11-127502 A | 5/1999 |

OTHER PUBLICATIONS

"Japanese Technical Book Titled as an Automotive Engineering," *Kabushiki Kaisha Sankaido*, Nov. 20, 1980.

* cited by examiner

Primary Examiner—Richard M. Lorence
Assistant Examiner—Dennis Abdelnour
(74) Attorney, Agent, or Firm—Foley & Lardner

(57) ABSTRACT

In a transmission system for an automotive vehicle, a planetary gear (3) comprises a ring gear (33) fixed to a housing, the planetary gear being interposed between a drive axle (1) in which a torque is transmitted from a power source (EG) of the vehicle and an output axle (2) via which the transmitted torque is outputted, a first clutch (A-C/L) is interposed between a carrier (32) of the planetary gear and the drive axle (1), a second clutch (B-C/L) is interposed between the carrier (32) of the planetary gear and the output axle (2), and a third clutch (C-C/L) is interposed between a sun gear (31) of the planetary gear and the drive axle (1).

20 Claims, 6 Drawing Sheets

TRANSMISSION SYSTEM FOR AUTOMOTIVE VEHICLE

BACKGROUND OF THE INVENTION

1. Field of the Invention

The present invention relates to a transmission system for an automotive vehicle suitable for a power transmission between a drive (or power) source such as an internal combustion engine and a transmission such as an automatic transmission.

2. Description of the Related Art

In general, in an automotive vehicle equipped with the automatic transmission, a fluid coupling device such as a torque converter has been used as the transmission system. Such a torque converter as described above is exemplified by a Japanese Technical Book titled as an automotive engineering (published by Kabushiki Kaisha Sankaido on Nov. 20, 1980).

A clutch is well known as another transmission system.

An automatic clutch system has been proposed which automatically engages or disengages its clutch according to its necessity in view of a demand for operation easiness.

The automatic clutch in which a dry-type, single-plate clutch has been used.

SUMMARY OF THE INVENTION

However, a power loss occurs in the torque converter due to an implementation of a power transmission via a fluid and a fuel consumption accordingly becomes worsened. On the other hand, the power loss in the case of the clutch type transmission system is not easy to occur but it is difficult to perform a low-speed-and-high-torque transmission which is a merit of the torque converter.

It is an object of the present invention to provide a transmission system for an automotive vehicle which is superior to a torque transmission efficiency with less fuel consumption than that the torque converter has.

The above-described object can also be achieved by providing a method applicable to a transmission system for an automotive vehicle, comprising: interposing a planetary gear between a drive axle in which a torque is transmitted from a power source of the vehicle and an output axle via which the transmitted torque is outputted, the planetary gear comprising a ring gear fixed to a housing: interposing a first clutch between a carrier of the planetary gear and the drive axle; interposing a second clutch between the carrier of the planetary gear and the output axle; and interposing a third clutch between a sun gear of the planetary gear and the drive axle.

The above-described object can also be achieved by providing a method applicable to a transmission system for an automotive vehicle, comprising: interposing a planetary gear between a drive axle in which a torque is transmitted from a power source of the vehicle and an output axle via which the transmitted torque is outputted, the planetary gear comprising a ring gear fixed to a housing: interposing a first clutch between a carrier of the planetary gear and the drive axle; interposing a second clutch between the carrier of the planetary gear and the output axle; and interposing a second clutch between a sun gear of the planetary gear and the drive axle.

The other objects and features of this invention will become understood from the following description with reference to the accompanying drawings.

DETAILED DESCRIPTION OF THE PREFERRED EMBODIMENTS

Reference will hereinafter be made to the drawings in order to facilitate a better understanding of the present invention.

[First Embodiment]

Figure 2:
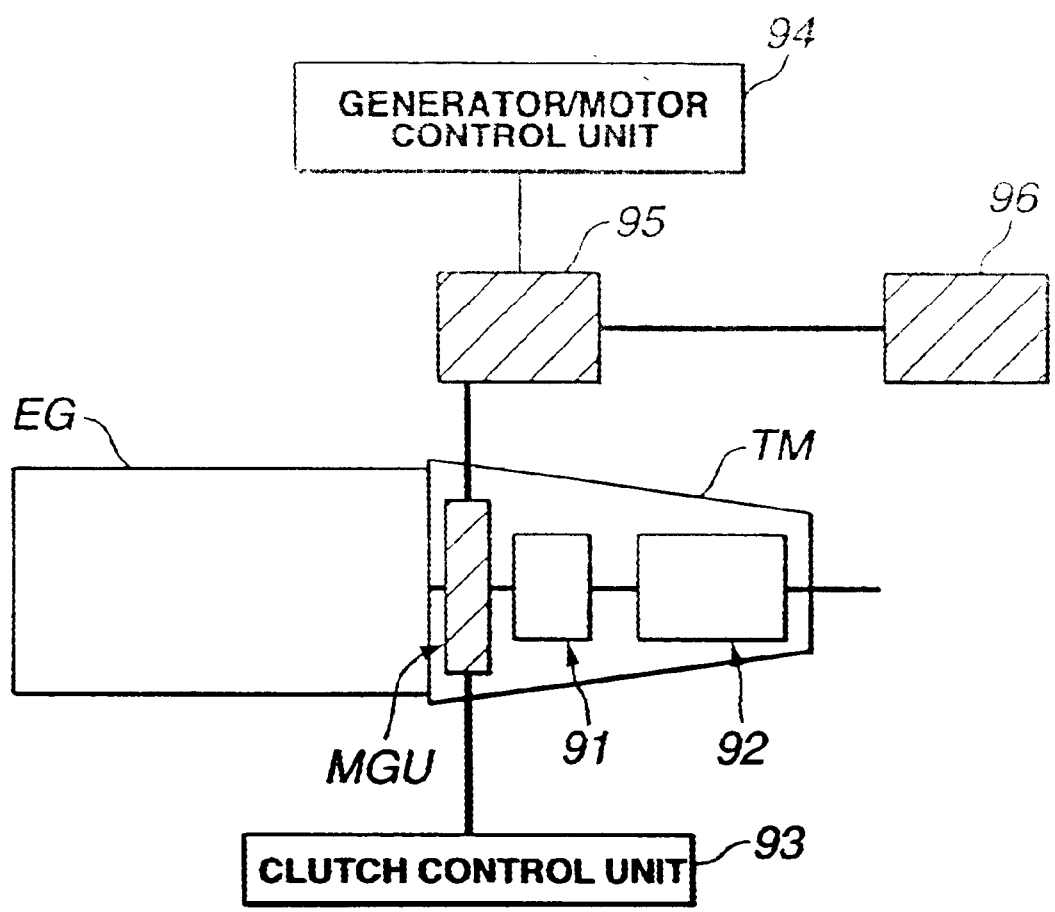
FIG. 2 is a whole schematic configuration view of the transmission system in the first preferred embodiment shown in FIG. 1.

A generator/motor unit MGU to which a transmission system in a first preferred embodiment according to the present invention is applicable is installed within a transmission TM as shown in FIG. 2, i.e., in a midway of a power transmission path between an engine EG and a forward-backward mechanism portion 91 of transmission TM, in other words, is installed at a position at which a torque converter applied in a generally available automatic transmission is disposed. In FIG. 2, a reference numeral 92 denotes a transmission mechanism portion.

Transmission mechanism 92 and forward-rearward mechanism portion 91 constitutes the automatic transmission.

These of forward-backward mechanism portion 91 and transmission mechanism 92 may be constituted by a manual transmission or CVT (continuously variable transmission).

The CVT is exemplified by U.S. Pat. No. 6,184,603 issued on Feb. 6, 2001 (the disclosure of which is herein incorporated by reference).

Figure 3:
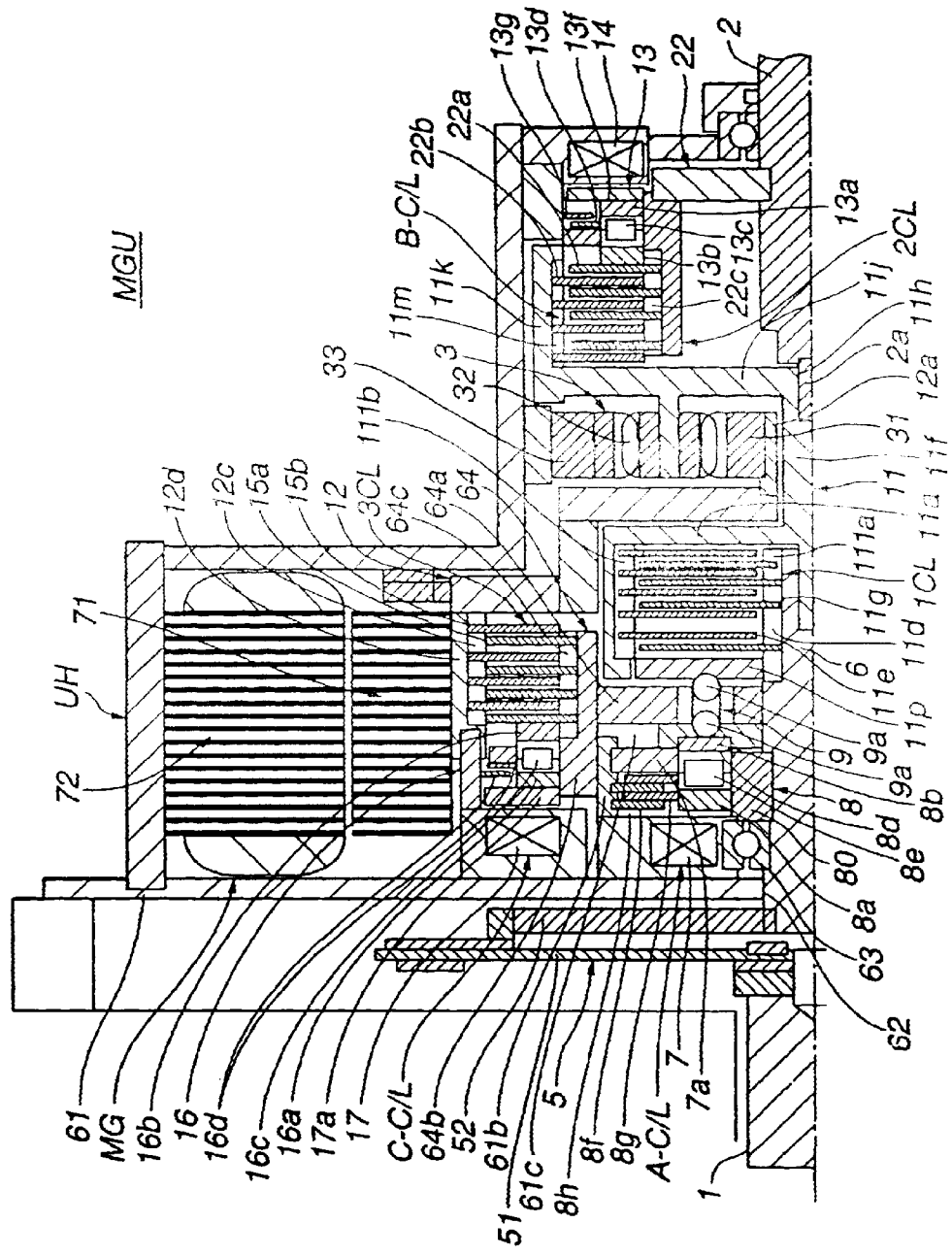
FIG. 3 is a cross sectional view of the transmission system in the first preferred embodiment shown in FIGS. 1 and 2.

FIG. 3 is a cross sectional view of an upper half portion of generator/motor unit MGU in the first embodiment according to the present invention. It is noted that since a lower half portion of generator/motor MGU is exactly the same as the upper half portion, the lower half portion is omitted in FIG. 3.

Generator/motor unit MGU includes: a unit housing UH connected to a block housing (not shown) of engine EG or transmission TM; an input axle 1 (or, so-called, a drive axle (shaft)) linked to an output axle (not shown) of engine EG; an output axle 2 linked to an input axle (not shown) of transmission TM; a planetary gear 3 to perform a torque transmission between output axle 2 and input axle 1; a generator/motor MG to perform an electric power supply and receipt between rotary elements linked to planetary gear 3; a first clutch A-C/L, a second clutch B-C/L, and a third clutch C-C/L constituting three wet-type multiple-plate clutches as will be described later.

While one end of input axle 1 is linked to the output axle of engine (not shown), the other end thereof is linked to a center axle 6 via a vibration absorbing device 5.

Then, vibration absorbing device 5 includes: a vibration absorbing resilient plate 51 having a high rigidity in its rotation direction and having a low rigidity in its bending direction; and a damper plate 52 having a low rigidity in its rotation direction and a high rigidity in its bending direction.

Each outer peripheral end edge portion of both plates 51 and 52 is integrally coupled together. An inner peripheral portion of resilient plate 51 is coupled to the other end of input axle 1. An inner peripheral portion of damper plate 52 is coupled to a center axle 6 of first clutch A-C/L. Hence, when the torque is inputted to input axle 1 from the output axle of engine EG, the engine output torque is transmitted to center axle 6 sequentially via resilient plate 51 and damp ate 52. At this time, both bend vibration and torsional vibration are absorbed by resilient plate 51 and damper plate 52.

Damper plate 52 may be constituted by a well known torsional damper. Damper plate 52 includes outer plate and inner plate which are displaceable relatively in the rotation direction with a spring-like damper main body to absorb the twist motion (torsion) interposed between both of the outer and inner plates described above. With the outer periphery of the outer plate connected to the outer periphery of resilient plate 51, the inner periphery of the inner plate is coupled to center axle 6. The outer plate and inner plate are relatively displaced to each other in the rotation direction by an resiliency of the spring-like damper main body.

Planetary gear 3 includes a sun gear 31, a carrier 32, and a ring gear 33.

Ring gear 33 is fixedly attached onto an inner periphery of unit housing UH.

Each axial portion 6 and 12a of both first rotary body 11 and second rotary body 12 is coaxial to input axle 1 and output axle 2 but an outer diameter of each axial portion 6 and 12a is different from each other. Sun gear 31 is fixed to an outer periphery of axial portion 12a of second rotary body 12.

First rotary body 11 includes a center axle 11f (connected to center axle denoted by 6 in FIG. 3) at its axial center portion and an insert hole 11g installed at a left end portion of center hole 11f is inserted into center axle 6.

On the other hand, insert shaft 2a installed on an insert hole 11b is provided on a right-end portion of center axle 11f (as viewed from FIG. 3). First rotary body 11 is so constructed as to enable the relative rotation of center axle 6 and output axle 2. First rotary body 11 is rotated together with a carrier 32 with a disc (disc-shaped plate) 11j integrally coupled to the right end portion of center axle 11f (as viewed from FIG. 3) and coupled to carrier 32.

A first clutch A-C/L is interposed between first rotary body 11 integrally rotatable with carrier 32 and center axle 6.

First clutch A-C/L includes: a clutch casing 11a having a substantially bell-shaped cylindrical body and which is coupled to a left end portion shown in FIG. 3 at center axle 6 of first rotary body 11; a first multiple-plate clutch 1CL having inner clutch plates 11d and outer clutch plates 11e alternately and axially arranged in splines 111a and 111b and coupled thereto, these splines 111a and 111b being formed on the outer peripheral surface of center axle 6, namely, input axle 1 and an inner peripheral surface of clutch casing 11a; and a pressing member 11p.

When the inner and outer clutch plates 11d and 11e are pressed against each other by the pressing member 11p, a torque transmission between center axle 6, i.e., input axle 1 and carrier 32 is carried out.

This press operation from pressing member 11p is carried out by a first electromagnetic solenoid 7 and a first control cam 8.

First electromagnetic solenoid 7 is supported on a disc-like plate 61 installed on one end of unit housing UH. Center axle 6 is supported via bearings 62 and 63 on inner peripheries of disc-like plate 61 and first electromagnetic solenoid 7.

First control cam 8 serves to develop a pressure in an axial direction of input axle 1, viz., center axle 6 according to an input torque thereonto.

First control cam 8 includes a first ring 8a which is enabled to rotate together with center axle 6 in a floating support state on a circular member 80 with oil intervened between circular member 80 fixed onto an outer periphery of center axle 6 and first ring 8a itself, the axial movement of first ring 8a being limited; a second ring 8b which is supported in the floating support state on circular member 80 fixed to center axle 6 and is enabled to be displaced to its axial direction; a thrust roller 8e installed on first ring 8a; and a cam groove 8d formed on an opposing surface of thrust roller 8e.

When the torque in the relative rotation direction is developed between first ring 8a and second ring 8b, thrust roller 8e is displaced and runs on a slanted surface of cam groove 8d. Consequently, first ring 8a and second ring 8b are pressed away from each other in the axial direction.

The torque developed between first ring 8a and second ring 8b is amplified with a multiplication (power boost) factor according to a gradient of the slanted surface of cam groove 8d so that the boosted power can be converted into the pressure in the axial direction.

Thrust roller 8e is formed in a cylindrical shape and is installed on an inner peripheral portion of first ring 8a.

Figure 4:
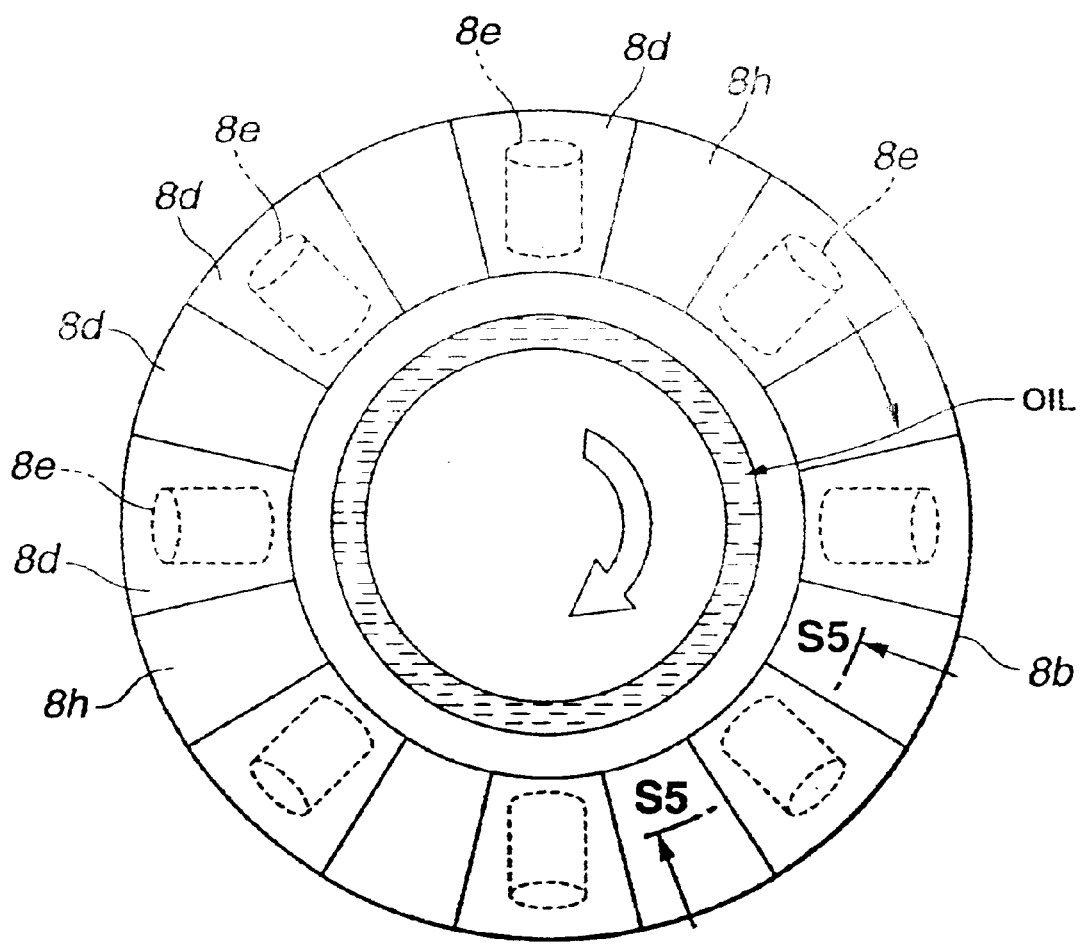
FIG. 4 is an explanatory elevation view representing an essential part of the transmission system shown in FIGS. 1 through 3.
Figure 5A:
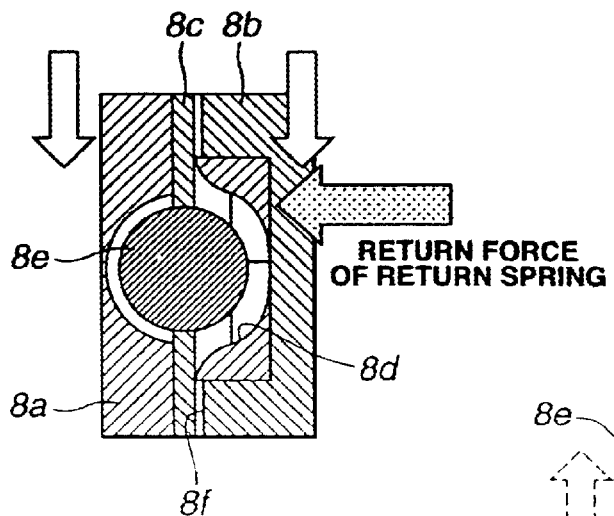
FIGS. 5A and 5B are explanatory views representing operations and the same structure in the essential part of the transmission system shown in FIGS. 1 through 4.
Figure 5B:
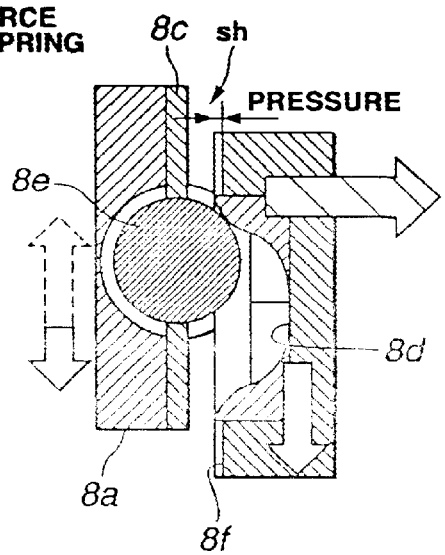

As shown in FIG. 4, part of thrust roller 8e is housed in a housing groove 8m formed radially on an end surface of first ring 8a, as shown in FIGS. 5A and 5B which are cross sectional views cut away along a line S5—S5 in FIG. 4.

Part of thrust roller 8e is projected from holes 8n formed on a plate-like retaining plate 8c which is brought in contact with the end surface of first ring 8a and their outer peripheral edge portions are engaged on the peripheral edges of holes 8n so as to prevent a drop out from first ring 8a.

On the other hand, cam groove 8d and flat portion 8h are alternately formed on second ring 8b. In FIG. 4, an alphabetic expression of OIL denotes oil which serves for second ring 8b to be in the floating state.

Second ring 8b is biased in a direction at which second ring 8b is brought in contact with first ring 8a as shown in FIG. 5A with a spring force Fsp of a return spring in a plate spring-like form as biasing device interposed between second ring 8b and circular member 80.

FIG. 5A represents a state in which both of first and second rings 8a and 8b indicate initial positional states at which both of first and second rings 8a and 8b are not rotated relatively to each other.

FIG. 5B represents a state in which both of first and second rings 8a and 8b are relatively rotated to each other from the initial state of FIG. 5A.

When both of first and second rings 8a and 8b are relatively rotated as shown in FIG. 5B, cam groove 8d of second ring 8b is moved on thrust roller 8e so that a relative displacement sh is developed as shown in FIG. 5B and a cam operation by which a pressure (propelling force) Fp is developed.

Referring back to FIG. 3, second ring 8b is faced against pressing member 11p. Operation rods 9 are interposed between second ring 8b and pressing member 11p. When second ring 8b is displaced in the axial direction, operating rods 9 are intervened to press on pressing member 11p. It is noted that operating rods 9 are plural and are disposed in the axial direction penetrating through a disc-shaped plate 64a and balls 9a are attached onto both ends of operating rods 9.

Splines 8h and 61C are formed on an outer peripheral surface of first ring 8a and an inner peripheral surface of a cylindrical member 61b which is integrally attached to disc (disc-like plate) 61 which is opposed to the outer peripheral surface of first ring 8a. Plural sheets of miniature clutch plates 8f and 8g are aligned within the respective splines 8h and 61C so as to be enabled to be engaged together.

At an adjacent position to miniature clutch plate 8g, an armature 7a which is to be attracted by first electromagnetic solenoid 7 is movably supported in the axial direction on cylindrical member 64b.

Hence, when first electromagnetic solenoid 7 receives the power (is energized) and armature 7a is attracted thereto, miniature clutch plates 8f and 8g (so-called, a pilot clutch) are tightly contacted to each other under a pressure so that a rotation of first ring 8a is limited. Thus, a torque in the rotation direction of both of first and second rings 8a and 8b is developed between first and second rings 8a and 8b.

Hence, first control cam 8 executes such a cam operation as described above so that a pressure in the axial direction is developed on second ring 8b. Pressing member 11p is, then, pressed via operating rods 9 so that above-described clutch plates 11d and 11e are clutched.

A multiplication force (boosted power) rate of pressure Fp developed according to an attraction force of first electromagnetic solenoid 7 in first control cam 8 can be expressed as:

Multiplication force (boosted power) rate=(pressure Fp)/(attraction force by first electromagnetic solenoid 7)=(torque transmission rate)/(friction torque by first electromagnetic solenoid 7).

Figure 7:
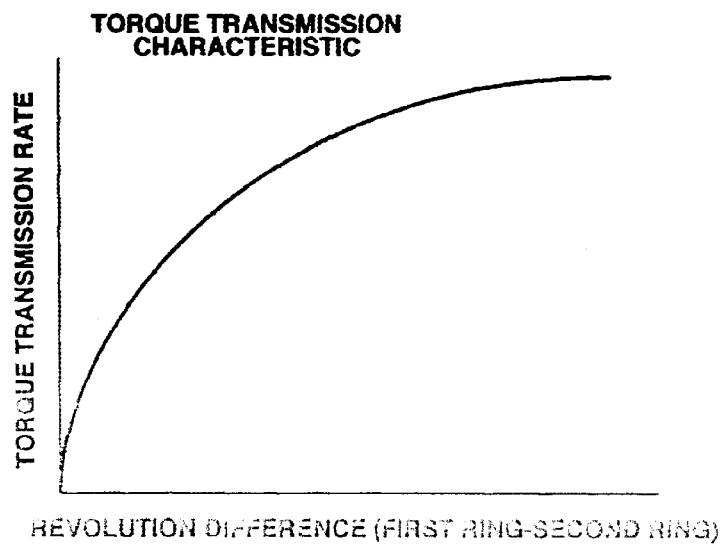
FIG. 7 is a characteristic graph representing a torque transmission characteristic at a first control cam of a first clutch of the transmission system in the first embodiment shown in FIGS. 1 through 6.

In addition, a torque transmission characteristic at first control cam 8 is shown in FIG. 7.

It is noted that although thrust roller 8e is formed of a cylindrical form, a spherical member may be used in place of thrust roller 8e and the same cam groove as cam groove 8d may be formed on first ring 8a.

In this alternative case, when the torque is inputted in the relative revolution direction of both cam rings 8a and 8b, the spherical member is pressed by cam grooves 8d so that the same action as the first embodiment described above can be achieved.

It is also noted that in place of balls 9a interposed between both ends of operating rods 9, such a thrust roller as described above may be used.

Next, second clutch B-C/L will be described below with a chief reference to FIG. 3.

Second clutch B-C/L is interposed between first rotary body 11 and output axle 2. A first cylindrical member 22 in a bell-shaped cylindrical form is integrally installed on an outer periphery of output axle 2 and a spline 22c is formed on the outer periphery of first cylindrical member 22.

On the other hand, a second cylindrical member 11k is disposed on the outer periphery of disc (disc-like plate 11j and a spline 11m is formed on second cylindrical member 11k so as to face against spline 22c. Plural sheets of inner clutch plates 22a and outer clutch plates 22b are engaged to each of splines 22c and 11m to constitute a second multiple-plate clutch 2CL.

A coupling of second multiple-plate clutch 2CL is carried out by second control cam 13 and second electromagnetic solenoid 14. Second control cam 13 is provided with a first ring 13a, a second ring 13b, and a thrust roller 13c, in the same manner as first control cam 8 described above.

First ring 13a is supported in a floating manner on the outer periphery of second cylindrical member 11k so as to enable the relative rotation. Thrust roller 13c is mounted on first ring 13a. Furthermore, miniature clutch plate 13d and armature 13f are integrally installed onto first ring 13a. Another miniature clutch plate 13g is supported on unit housing UH so as to face against corresponding miniature clutch plate 13d. These miniature clutches 13d and 13g serves as pilot clutch.

In addition, a cam groove 13h is formed on second ring 13b at a position facing against thrust roller 13c. Second ring 13b is arranged so as to enable a pressure given to inner clutch plate 22a at an end surface of a left side as viewed from FIG. 3.

Hence, when the power is supplied to second electromagnetic solenoid 14 to develop the attraction force thereat, second control cam 13 is operated to displace first ring 13a toward a right direction as viewed from FIG. 3 so that miniature clutch plates 13d and 13g are engaged with each other and the torque is developed in the rotation direction on respective first and second rings 13a and 13b. Then, cam groove 13h is displaced so as to move over thrust roller 13c to achieve such an amplification function as to generate an operating force in the axial direction. Thus, second ring 13b is pressed against inner clutch plate 22a so that second clutch B-C/L, viz., second multiple-plate clutch 2CL can be clutched.

Next, third clutch C-C/L will be described below with the chief reference to FIG. 3.

Third clutch C-C/L is disposed in an outer diameter direction of first clutch A-C/L coaxially with first clutch A-C/L.

Third clutch C-C/L is interposed between sun gear 31 and center axis 6. That is to say, a third rotary body 64 is installed integrally to center axis 6 and includes a disc-shaped plate 64a and a cylindrical body 64b coupled to an outer peripheral end of plate 64a.

A spline 64c is provided on an outer periphery of cylindrical body 64b of third rotary body 64. A spline 12c is also formed on an inner periphery of cylindrical member 12d of second rotary body 12 integrally installed onto sun gear 31. An inner clutch plate 15a and an outer clutch plate 15b are movably installed on these splines 64c and 12c to be enabled to move in the axial direction of center axle 6 to constitute a third multiple-plate clutch 3CL.

Third multiple-plate clutch 3CL is clutched by third control cam 16 and third electromagnetic solenoid 17.

Third control cam 16 includes a first ring 16a, a second ring 16b, a thrust roller 16c, and miniature clutch plates 16d and 16d (the pilot clutch) in the same way as first control cam 8 described above. When the power is supplied to third electromagnetic solenoid 17 to generate the attraction force, an armature 17a is displaced in the axial direction to clutch miniature plates 16d and 16d. Third control cam 16 is operated so as to achieve the amplification function to develop the operating force in the axial direction. Then, second ring 16b presses inner clutch plate 15a to clutch third clutch C-C/L (third multiple-plate clutch 3CL).

Above-described generator/motor MG is provided with a rotor 71 and a stator 72.

Rotor 71 is attached onto an outer peripheral surface of cylindrical member 12*d* of second rotary body 12. Stator 72 is attached onto the inner periphery of unit housing UH so as to face against the outer periphery of rotor 71. Hence, when stator 72 receives the power, a rotational torque is given to rotor 71. When rotor 71 is rotated, an induced current is developed on stator 72 to generate the electric power.

As shown in FIG. 2, the operations of respective clutches A-C/L, B-C/L, and C-C/L are controlled by a clutch control unit 93.

In addition, the operation of generator/motor unit MGU is controlled by a generator/motor control unit 94.

Generator/motor control unit 94 is connected to generator/motor unit MGU via an inverter 95. Inverter 95 is connected to a battery 96. It is noted that a controller defined in claims corresponds to each of the clutch control unit 93 and generator/motor control unit 94.

Figure 1:
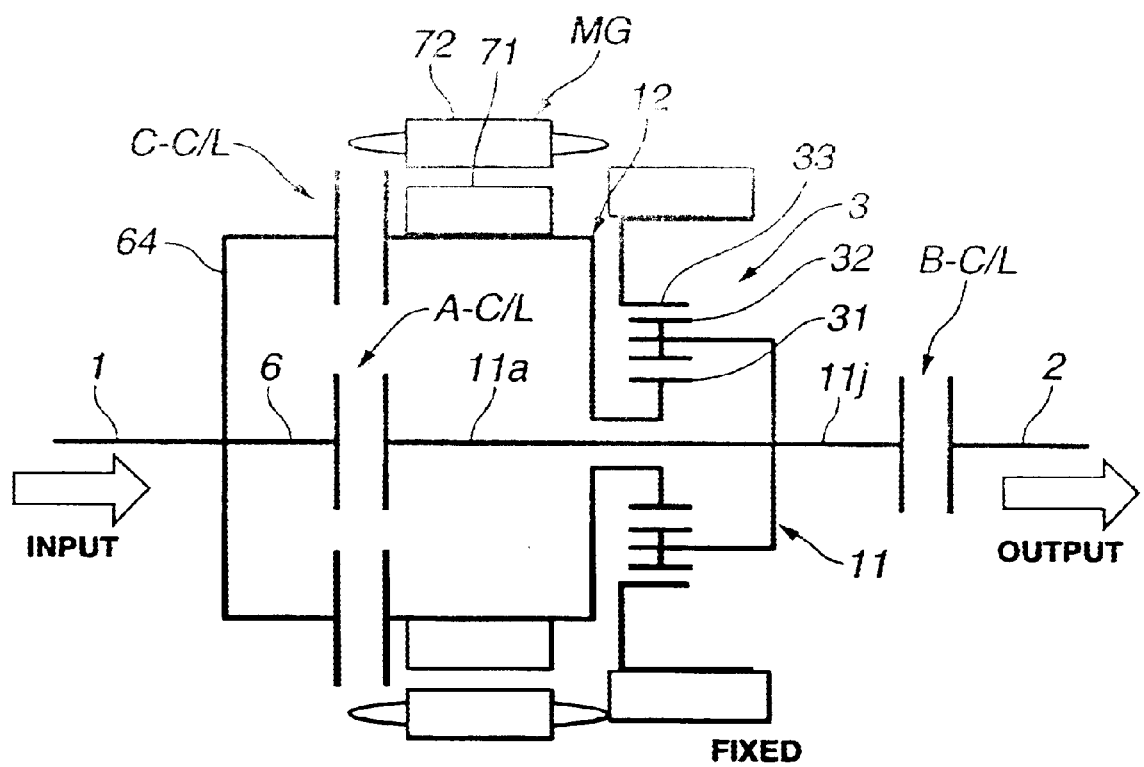
FIG. 1 is a skeleton view representing a structure of a generator/motor unit MGU to which a transmission system in a first preferred embodiment according to the present invention is applicable.

Furthermore, FIG. 1 is a skeleton view of generator/motor unit MGU.

Next, the operation of generator/motor unit MGU shown in FIGS. 1 and 3 will be described in details below. (Engine start)

When engine EG is started, first clutch A-C/L is clutched with second and third clutches B-C/L and C-C/L released and generator/motor unit MGU is driven as a motor.

Figure 6:
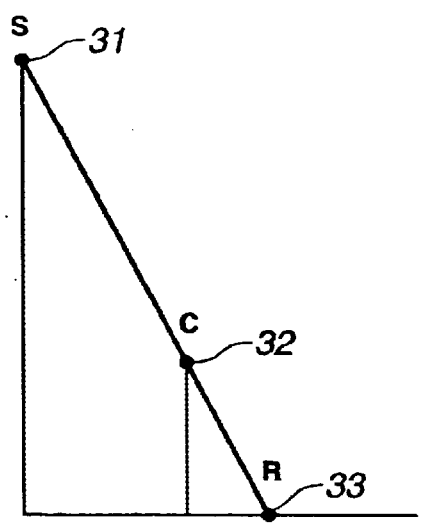
FIG. 6 is a gear ratio diagram in the first embodiment shown in FIGS. 1 through 5B.

Hence, a driving force of generator/motor MG is inputted to sun gear 31 and the driving force is then outputted to input axle 1 from carrier 32 via first rotary body 11 and first clutch A-C/L to start engine EG. In this case, ring gear 33 is fixed to the unit housing UH so that the driving force is speed-reduced at carrier 32, as shown in a gear ratio diagram of FIG. 6, but the torque of generator/motor MG is augmented at carrier 32 and outputted to engine EG. It is noted that a speed reduction ratio (Ns/Nc) in this case can be expressed as follows: $Ns/Nc=(ns+nr)/ns$. In this equation, ns denotes the number of teeth of sun gear 31 and nr denotes the number of teeth of ring gear 33. In this embodiment, Ns/Nr is set to ⅓ ($Ns/Nr=⅓$).

Therefore, the drive torque required to start engine EG in generator/motor MG can be lowered as compared with a case where the speed-reduction ratio cannot be obtained and the size of generator/motor MG can be miniaturized.

That is to say, in the first embodiment of the transmission system, generator/motor unit MGU is tried to be installed in a limited space in which the torque converter is conventionally installed in the automatic transmission. Because of this, it is aimed that although generator/motor MG is arranged at the outside of the rotary body, the whole structure of generator/motor is as compact as possible. In such a structure as described above, the speed reduction of the required driving torque of generator/motor MG is very effective in a compactification of generator/motor unit MGU.
(Vehicular Start and Creeping Run)

When the vehicle is started after the start of engine EG and when the vehicle is in the creep run state to gradually forward or rearward the vehicle with an accelerator of the vehicle not depressed, second and third clutches B-C/L and C-C/L are clutched and first clutch A-C/L only is released by generator/motor control unit 94.

Hence, the driving force of engine EG is inputted to sun gear 31 from input axle 1 via third clutch C-C/L and second rotary body 12 and the driving force thereof is outputted to output axle 2 from carrier 32 via second clutch B-C/L. In this case, the drive torque inputted to sun gear 31 is speed-reduced and outputted from carrier 32 as shown in the gear ratio diagram of FIG. 6 to augment the drive torque.

Thus, the vehicular start can smoothly be carried out. The creep run can also smoothly be carried out.

That is to say, without introduction of the slide motion on the frictional surface bringing out the heat generation in any of the clutches, the smooth start and creep run with the drive torque augmented can be achieved.

In addition, since the desired speed reduction in planetary gear 3 can be achieved, in a case where second clutch B-C/L only is clutched to function generator/motor MG as the motor during the vehicular start, the drive torque from generator/motor MG is inputted to sun gear 31, is speed-reduced thereat, and is outputted to output axle 2 from carrier 32. Thus, the vehicular start and creep run can be carried out only by the driving force from generator/motor MG.

Hence, even if a sufficient charge is carried out in battery 96, it is possible to improve a fuel consumption by carrying out the vehicular start and creep run through generator/motor MG described above.
(Steady State Run and Vehicular Acceleration)

After the vehicle is started as described above, generator/motor control unit 94 is activated to clutch first and second clutches A-C/L and B-C/L and to release third clutch C-C/L with engine EG driven.

Hence, the driving force of engine EG is outputted to output axle 2 from input axle 1 via center axle 6 (11*f*), first clutch A-C/L, first rotary body 11, and second clutch B-C/L. In this case, since the engine torque is directly outputted to output axle 2, the speed reduction ratio indicates 1:1.
(Deceleration and Regeneration)

In a case where a power regeneration is carried out during a vehicular deceleration, engine EG is stopped and generator/motor control unit 94 is operated to clutch second clutch B-C/L only and to release first and third clutches A-C/L and C-C/L. Hence, the torque inputted to output axle 2 from the drive wheels of the vehicle is inputted to carrier 32 and is speed-augmented thereat and outputted to sun gear 31.

Then, rotor 71 is rotated by a speed multiplication (speed augment, three times) together with second rotary body 12 and rotor 71 serves to charge generator/motor MG. In this way, generator/motor MG is multiplied by three times, is rotated, and is charged. Hence, a high charge efficiency can be achieved.

In addition, during the power regeneration with the vehicle decelerated, the charge capacity of battery 96 is so high that the charge quantity is not so much required. In this case, with engine EG left driven, first clutch A-C/L is also clutched in addition to second clutch B-C/L. Hence, part of the torque inputted to first rotary body 11 from output axle 2 is inputted directly via first clutch A-C/L to effect an engine braking.
(Hill Hold)

When the vehicle is held at a vehicular velocity of zero (0 km/h) at an ascending slope on which the vehicle is running, first clutch A-C/L is released and second and third clutches B-C/L and C-C/L are clutched in the same way as described in the case of the vehicular start and creep run. In addition, drive torque speed-reduction is carried out and is outputted at planetary gear 3.

At the same time, according to its necessity, generator/motor MG is driven by a predetermined quantity as the motor to convert the input torque into an electrical energy. Then, such a power circulation generation that part of the output energy of engine EG is collected into battery 96 can be carried out. Or, the engine output may be controlled so that the vehicular velocity becomes zero without drive of generator/motor MG. Or with the generator/motor driven as the motor, the addition of the output of generator/motor MG to the engine output may be carried out for output axle 2.

As described above, in the first preferred embodiment of the transmission system, without use of the torque converter described above, the torque transmission is carried out using planetary gear 3 and respective three multiple-plate clutches A-C/L, B-C/L, and C-C/L.

Hence, a superior torque transmission efficiency can be achieved with less fuel consumption than that the torque converter has.

In addition, since the planetary gear 8 is provided to make the speed-reduction and to carry out the torque transmission although the transmission system uses the planetary gear 3 and each of the first, second, and third clutches A-C/L, B-C/L, and C-C/L, it is made possible to output a low-speed-and-high-torque power without use of a device such as to slide the clutch involving the heat generation. Hence, it is possible to achieve the vehicular start, creeping run, and the hill hold in the transmission system in the first embodiment for the automotive vehicle.

Furthermore, although engine EG is started with generator/motor MG, the torque of generator/motor MG can be transmitted to engine EG with the torque augmentation carried out at the planetary gear during the vehicular start.

Hence, the miniaturization of generator/motor MG can be achieved. Especially, in the case of the first embodiment, generator/motor MG is attached onto the outer periphery of second rotary body 12 so that an axial dimension of whole generator/motor unit MGU can be suppressed. In this structure, although, when it is necessary to develop a large output torque as generator/motor MG, a large profile dimension is resulted and a large size and increase in weight are introduced, these disadvantages can be avoided in the transmission system according to the present invention.

In addition, since first clutch A-C/L and third clutch C-C/L are arranged coaxially in the outer diameter direction, the increase in the axial dimension is suppressed so that the compact structure can be achieved. Consequently, an easiness in mounting in the vehicle can be improved.

[Second Embodiment]

Figure 8A:
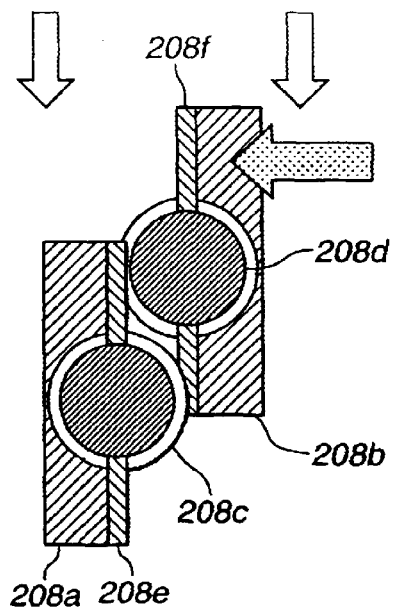
FIGS. 8A and 8B are explanatory views representing operations and the same structure of an essential part of the transmission system in a second preferred embodiment according to the present invention.
Figure 8B:
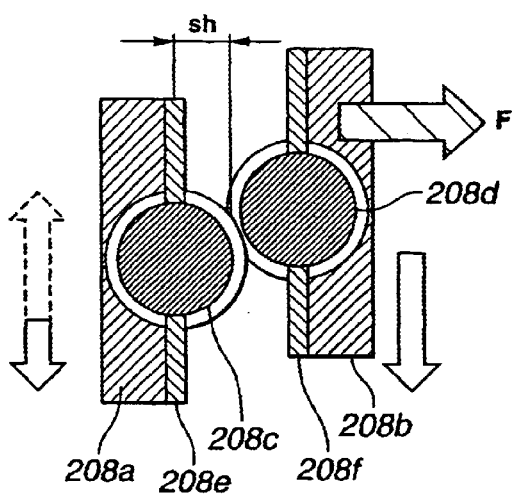

FIGS. 8A and 8B show an essential part of the transmission system in a second preferred embodiment according to the present invention, viz., an essential part of first control cam denoted by 208 in the second embodiment.

Thrust rollers 208c and 208d are retained on respective first ring 208a and second ring 208b through retaining members 208e and 208f, respectively.

Hence, when both rings 208a and 208b are rotated relatively with each other, the surfaces of both thrust rollers 208c and 208d are brought in close contact with each other as a cam surface. Hence, as shown in FIG. 8B, a relative displacement sh occurs in the axial direction to develop pressure F.

In the second embodiment, an axial displacement becomes larger than the rotational displacement of first control cam 208. Consequently, a higher response characteristic than the second embodiment can be achieved.

It is noted that the structure of first control cam 208 described in the second embodiment may be applied to second control cam 13 and third control cam 16 described in the first embodiment.

It is also noted that the other structure in the second embodiment is the same as that of the first embodiment and, hence, the detailed description thereof will be omitted herein.

The entire contents of a Japanese Patent Application No. 2000-400854 (filed in Japan on Dec. 28, 2000) are herein incorporated by reference. Although the invention has been described above by reference to the first and second embodiments of the invention, the invention is not limited to the embodiments described above. Modifications and variations of the embodiments described above will occur to those skilled in the art in the light of the above teachings.

For example, in the first and second embodiments, the transmission system is applicable to the torque transmission between the engine EG and the transmission TM in the automotive vehicle. However, the transmission system according to the present invention is applicable to the torque transmission in an industrial equipment except the automotive vehicle.

The scope of the invention is defined with reference to the following claims.

What is claimed is:

1. A transmission system for an automotive vehicle, comprising:
   a planetary gear comprising a ring gear fixed to a housing, the planetary gear being interposed between a drive axle in which a torque is transmitted from a power source of the vehicle and an output axle via which the transmitted torque is outputted;
   a first clutch interposed between a carrier of the planetary gear and the drive axle;
   a second clutch interposed between the carrier of the planetary gear and the output axle; and
   a third clutch interposed between a sun gear of the planetary gear and the drive axle.

2. A transmission system for an automotive vehicle as claimed in claim 1, wherein the power source is an internal combustion engine and wherein the drive axle receives the torque from the engine and the output axle outputs the torque to a vehicular automatic transmission.

3. A transmission system for an automotive vehicle as claimed in claim 1, wherein each of the first, second, and third clutches comprises: a multiple-plate clutch; a second ring adjoined to the multiple-plate clutch and enabled to press the multiple-plate clutch; a first ring enabled to be displaced relatively to the second ring in a rotation direction thereof; a control cam interposed between the first and second rings to output a boosted power in an axial direction thereof along with a relative displacement of both of the first and second rings to move axially the second ring relatively to the first ring, thus pressing and clutching the corresponding multiple-plate; and a pilot clutch, upon a receipt of an attraction force generated by an electromagnetic solenoid, to make the first ring a rotational stop.

4. A transmission system for an automotive vehicle as claimed in claim 3, wherein the first clutch comprises: a substantially bell-shaped cylindrical clutch case coupled to the center axle of a first rotary body integrally rotated with the carrier; a first multiple-plate clutch comprising inner and outer clutch plates alternately disposed and coupled to splines formed on the outer periphery of the center axle which is an input axle of the transmission system and an inner peripheral surface of the clutch case; and a pressing member and wherein when the inner and outer clutch plates are pressed by the pressing member, a torque transmission is carried out between the center axle and the carrier.

5. A transmission system for an automotive vehicle as claimed in claim 4, wherein the second clutch comprises: a first cylindrical member of a bell-shaped cylindrical form integrally installed on an outer periphery of the output axle, a first spline formed on an outer periphery of the first cylindrical member of the bell-shaped cylindrical form integrally installed on an outer periphery of a disc portion of the first rotary body; a second spline formed on an inner periphery of the second cylindrical member so as to be opposed to the first spline; and a second multiple-plate clutch comprising inner clutch plates and outer clutch plates engaged to both of the first and second splines.

6. A transmission system for an automotive vehicle as claimed in claim 5, wherein the third clutch is disposed coaxially with the first clutch in an outer diameter direction of the first clutch and comprises a third rotary body integrally installed on the center axle and comprising a disc-shaped plate and a cylindrical plate coupled to an outer peripheral edge of the disc-shaped plate; a third spline formed on an outer periphery of the cylindrical plate of the third rotary body; a fourth spline formed on an inner periphery of a third cylindrical member installed on an outer periphery of a second rotary body integrally installed on the sun gear; and a third multiple-plate clutch comprising inner clutch plates and outer clutch plates interposed between the third and fourth splines and enabled to be moved in the axial direction of the center axle.

7. A transmission system for an automotive vehicle as claimed in claim 6, wherein the control cam of each of the first clutch, second clutch, and third clutch comprises: a thrust roller attached onto the first ring, the first ring being enabled to rotate together with a center axle in a floating support state on a circular member with oil intervened between the circular member fixed onto an outer periphery of the center axle and the first ring itself and an axial movement of the first ring being limited; and a cam groove formed on an opposing surface of thrust roller and wherein when a torque in a relative rotation direction is developed between the first ring and the second ring, the second ring being supported onto the circular member in the floating support state and being enabled to be moved in the axial direction of the center axle, the thrust roller runs on a slanted surface of the cam groove so that the torque developed between the first and second rings is amplified by a multiplication factor in accordance with a gradient of the slanted surface of the cam groove and is converted into a pressure in the axial direction of the center axle.

8. A transmission system for an automotive vehicle as claimed in claim 1, further comprising a generator/motor which is installed within the housing and comprising a stator and a rotor, an energy supply and receipt being enabled between the stator of the generator/motor and the rotor thereof, the rotor being interposed between the sun gear and the third clutch and being attached onto a rotary body rotated together with the sun gear, and the stator being supported on the housing and being opposed to the rotor.

9. A transmission system for an automotive vehicle as claimed in claim 8, further comprising a controller to switch between a clutching and a release of each of the first clutch, the second clutch, and the third clutch and to switch a function of the generator/motor between a power generator and a motor and wherein the controller executes a start control such that when the power source is to be started to be driven, the controller is operated to clutch only the first clutch and to function the generator/motor as the motor.

10. A transmission system for an automotive vehicle as claimed in claim 9, wherein the controller is operated to execute a torque augmentation control such that while both of the second and third clutches are clutched, the first clutch is released, whereby a vehicular start, a creep run, and a hill hold can be carried out.

11. A transmission system for an automotive vehicle as claimed in claim 9, wherein the controller further executes a steady state control such that while the first and second clutches are clutched, the third clutch is released, whereby a drive torque from the power source to the output axle is transmitted at a ratio of 1:1.

12. A transmission system for an automotive vehicle as claimed in claim 9, wherein the controller further executes a regeneration control during a vehicular deceleration such that, with only the second clutch clutched, the controller is operated to function the generator/motor as a power generator, whereby a drive wheel torque during the vehicular deceleration is regenerated by the generator/motor.

13. A transmission system for an automotive vehicle as claimed in claim 9, wherein the controller further executes a second generation control during a vehicular deceleration such that, with both of the first and second clutches clutched, the third clutch is released and the controller is operated to function the generator/motor as the power generator, whereby a power regeneration is carried out while a power source braking is effected.

14. A transmission system for an automotive vehicle as claimed in claim 9, wherein the controller further executes a hill hold control such that the controller is operated to function the generator/motor as either the power generator or the motor according to its necessity while both of the second and third clutches are clutched and the first clutch is released, whereby the hill hold control with the power source driven a vehicular stop can occur on an ascending slope on which the vehicle is running.

15. A method applicable to a transmission system for an automotive vehicle, comprising:
   interposing a planetary gear between a drive axle in which a torque is transmitted from a power source of the vehicle and an output axle via which the transmitted torque is outputted, the planetary gear comprising a ring gear fixed to a housing;
   interposing a first clutch between a carrier of the planetary gear and the drive axle;
   interposing a second clutch between the carrier of the planetary gear and the output axle; and
   interposing a third clutch between a sun gear of the planetary gear and the drive axle.

16. A method applicable to a transmission system for an automotive vehicle as claimed in claim 15, wherein the power source is an internal combustion engine and the output axle outputs the torque to a vehicular automatic transmission and further comprising installing a generator/motor within the housing, the generator/motor comprising a stator and a rotor, an energy supply and receipt being enabled between the stator of the generator/motor and the rotor thereof, the rotor being interposed between the sun gear and third clutch and being attached onto a rotary body rotated together with the sun gear, and the stator being supported on the housing and being opposed to the rotor.

17. A method applicable to a transmission system for an automotive vehicle as claimed in claim 16, further comprising executing a start control such that when the engine is started to be driven, clutching only the first clutch and functioning the generator/motor as a motor.

18. A method applicable to a transmission system for an automotive vehicle as claimed in claim 16, further comprising: executing a torque augmentation control such that while clutching both of the second and third clutches, releasing the first clutch, whereby a vehicular start, a creep run, and a hill hold can be carried out; and executing a steady state control such that while clutching both of the first and second clutches, releasing the third clutch, whereby a drive torque from the engine to the output axle is transmitted at a ratio of 1:1.

19. A method applicable to a transmission system for an automotive vehicle as claimed in claim 16, further comprising: executing a regeneration control during a vehicular deceleration such that, clutching only the second clutch, functioning the generator/motor as a power generator, whereby a drive wheel torque during the vehicular deceleration is regenerated by the generator/motor; and executing a second generation control during the vehicular deceleration such that, clutching both of the first and second clutches, releasing the third clutch, and functioning the generator/motor as the power generator, whereby a regeneration is carried out while an engine braking is effected.

20. A method applicable to a transmission system for an automotive vehicle as claimed in claim 16, further comprising executing a hill hold control such that functioning the generator/motor as either a power generator or a motor according to its necessity while clutching both of the second and third clutches and releasing the first clutch, whereby the hill hold control, with the engine driven, a vehicular stop can occur on an ascending slope on which the vehicle is running.

* * * * *